Patented Oct. 26, 1954

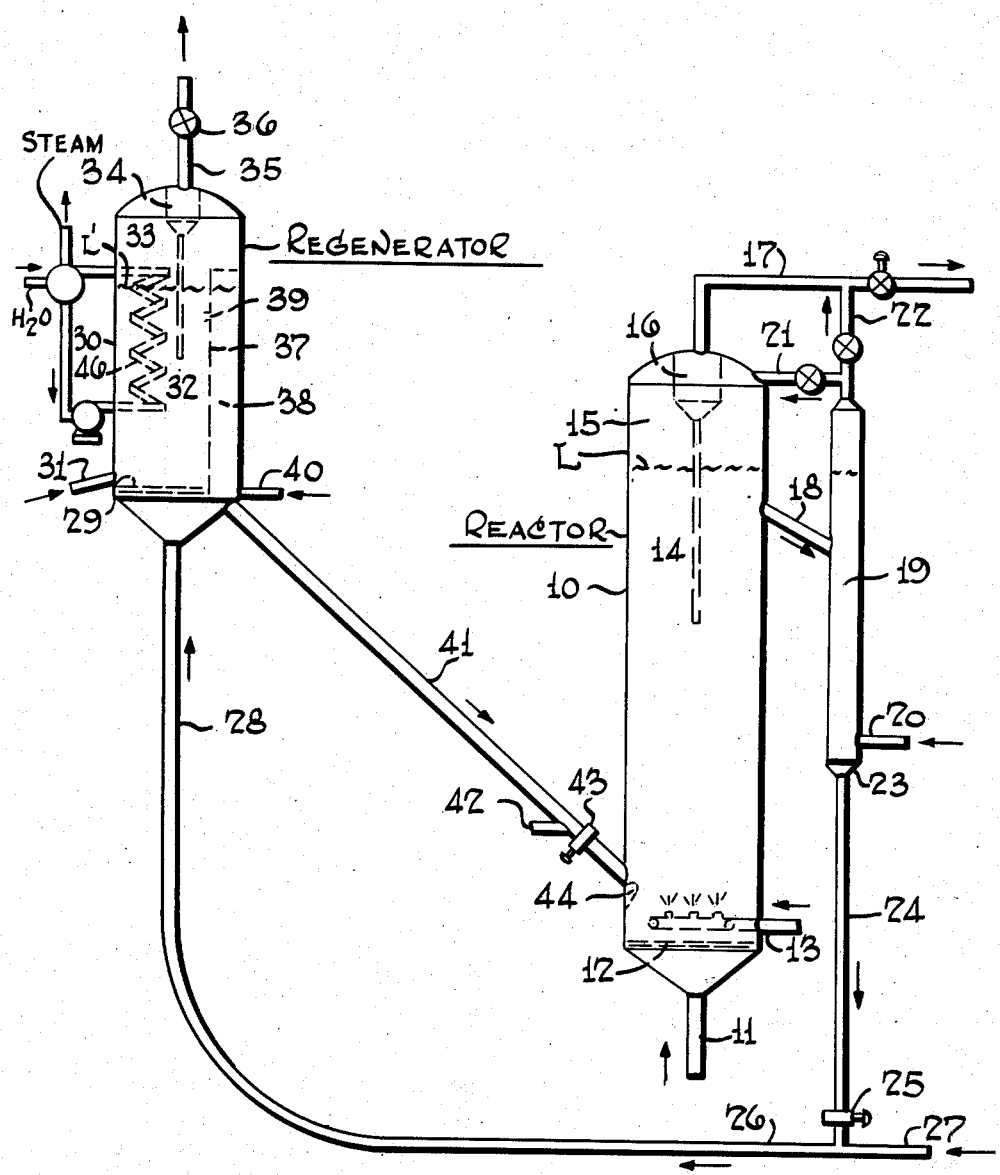

2,692,847

UNITED STATES PATENT OFFICE 2,692,847

FLUID HYDROFORMING OPERATION

Walter A. Rex, Westfield, N. J., assignor to Standard Oil Development Company, a corporation of Delaware Application December 26, 1951, Serial No. 263,453

4 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas at temperatures of 750°–1150° F. in the pressure range of about 50–1000 lbs. per sq. inch and in contact with such catalysts as molybdenum oxide, chromium oxide or, in general, oxides or sulfides of metals of groups IV, V, VI, VII and VIII of the periodic system of elements, alone, or generally supported on a base or spacing agent such as alumina gel, precipitated alumina, or zinc aluminate spinel. A good hydroforming catalyst is one containing about 10 wt. per cent molybdenum oxide upon an aluminum oxide base prepared by heat treating a hydrated aluminum oxide or upon zinc aluminate spinel.

It has been proposed in application Serial No. 188,236, filed October 3, 1950, to effect the hydroforming of naphtha fractions in a fluidized solids reactor system in which naphtha vapors are passed continuously through a dense fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the reactor bed and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, freshly regenerated catalyst particles from the regenerator standpipe into a stream of hot, hydrogen-rich recycle gas in a transfer line whereby the catalyst particles are subjected to a reconditioning treatment involving at least a partial reduction of higher catalytic metal oxides formed during regeneration to a lower or more catalytically active form of catalytic metal oxide during its passage through the transfer line into the reaction zone. In view of the high temperature of the regenerated catalyst (1050°–1200° F.) and the exothermic character of the reaction between the hot, freshly regenerated catalyst and the hydrogen, it is necessary to make the transfer line of small diameter and short in length in order to keep the time of contact of the catalyst and hydrogen-containing gas sufficiently short to avoid overtreatment and/or thermal degradation of the catalyst. It has also been proposed to cool the freshly regenerated catalyst by direct or indirect heat transfer with recycle reactor catalyst in order to achieve better control of the pretreatment while still utilizing the sensible heat carried by the regenerated catalyst on the reactor side of the system.

It is the object of this invention to provide the art with a novel method of operating a fluidized solids hydroforming system.

It is also an object of this invention to provide the art with a method of operating a fluidized solids hydroforming system which avoids the necessity for subjecting the freshly regenerated hydroforming catalyst to any treatment with hydrogen or hydrogen-rich gas prior to the introduction of the freshly regenerated catalyst into the hydroforming reaction zone.

These and other objects will appear more clearly from the detailed specification and claims which follow.

It has now been found that it is possible in fluid hydroforming operations to add the freshly regenerated catalyst directly to the hydroforming reaction zone without treatment with hydrogen or hydrogen-rich gas even where essentially complete removal of carbon from the catalyst is achieved in the regenerator, i. e. to less than 0.2 wt. per cent and preferably less than 0.1 wt. per cent carbon on catalyst, provided that the catalyst to oil ratio is low (less than about 1.5) and provided that the regenerated catalyst particles are substantially free from carbon monoxide, carbon dioxide and oxygen. At low catalyst to oil ratios the amount of freshly regenerated catalyst added to the reactor fluid bed is small in comparison to the amount of equilibrium or reactor catalyst in the fluid bed. Due to the turbulent nature of the reactor fluid bed, the sensible heat of the freshly regenerated catalyst as well as the exothermic heat of reaction between the higher catalytic metal oxides in the freshly regenerated catalyst and the hydrogen in the reaction mixture is rapidly distributed to the equilibrium or reactor catalyst, thereby avoiding overheating or thermal degradation of the catalyst. Moreover, the reaction or reduction of the freshly regenerated catalyst is relatively rapid even at reactor temperature conditions and accordingly only a small portion of the feed is passed over unreduced catalyst.

Reference is made to the accompanying drawing illustrating a schematic flow plan of a reactor-regenerator system in accordance with the present invention.

Referring to the drawing, 10 is a reactor vessel provided at the bottom with an inlet line 11 for the introduction of hot, hydrogen-rich or recycle process gas. A perforated plate or grid 12 is arranged horizontally in the lower part of the reactor vessel in order to insure uniform distribution of the incoming gas over the entire cross section of the reactor vessel. A separate inlet line 13 is shown for the introduction of naphtha feed above the grid member 12 although the naphtha feed may, if desired, be introduced separately or along with hydrogen-rich or recycle gas below the grid 12. The reactor vessel 10 is charged with finely divided hydroforming catalyst particles and the superficial velocity of the vapors and gases passing up through the reactor is so controlled as to form a dense, fluidized, turbulent bed of catalyst 14 having a definite level L superposed by a dilute or disperse phase 15 comprising a small amount of catalyst entrained in vaporous reaction products. The reaction products are taken overhead from reactor 10 through a cyclone separator 16 or the like for separating entrained catalyst particles. The separated catalyst particles are returned to the dense bed 14 through the dip pipe attached to the bottom of the cyclone separator. The reaction products, essentially free from catalyst particles pass from cyclone separator 16 into product outlet line 17 leading to suitable fractionating and/or storage equipment.

Catalyst particles are continuously withdrawn from the dense bed 14 through spent catalyst withdrawal conduit 18 into an external stripper vessel 19. It will be understood that the stripper could also be arranged within the reactor vessel itself, as by arranging a vertical conduit or cell, preferably extending above level L and provided with an orifice or port for controlling the discharge of catalyst from the dense bed into the stripper cell or conduit. A tap 20 is arranged near the bottom of the stripper for introducing a suitable stripping gas, such as steam, nitrogen, scrubbed flue gas or the like, which will serve to remove entrained or adsorbed hydrogen or hydrocarbons that would otherwise be carried to the regeneration zone and burned therein. The stripping gas and the stripped gases and vapors are withdrawn overhead from stripper 19 and passed through line 21 into the upper part of reactor 10 in the event that substantial amounts of catalyst are entrained and recovery thereof in reactor cyclone separator 16 is desired or through line 22 into product outlet line 17 in the event that it is desired to have the stripping gases and/or spent catalyst that has been in contact with the stripping gas by-pass the reactor. The lower end of stripper 19 is connected at 23 to conduit 24 and forms therewith a standpipe for developing sufficient fluistatic pressure to facilitate the transfer of the spent catalyst into the regenerator side of the system. A slide valve 25 or the like is provided near the base of the conduit 24 in order to control the discharge of spent catalyst into transfer line 26. Ordinarily sufficient gas is entrained with the catalyst passing through conduit 24 in order to maintain it in a fluidized or freely flowing condition. If desired, however, one or more gas taps can be provided along conduit 24 to supply fluidizing gas thereto.

The stripped spent catalyst is discharged from the base of the standpipe into transfer line 26 where it is picked up by a stream of regeneration gas or air supplied through line 27. The stream of air conveys the spent catalyst particles as a dilute suspension through transfer line 26 and spent catalyst riser 28 into the bottom of regenerator vessel 30. A perforated plate or distributor grid 29 is arranged near the bottom of regenerator 30 in order to insure uniform distribution of the incoming catalyst and air over the entire cross section of the regenerator. In view of the rate at which carbonaceous deposits are burned off hydroforming catalysts under elevated reaction pressures, it is advisable to use only part, preferably not more than 40%, of the air necessary for regeneration for conveying the spent catalyst through the transfer line 26 and riser 28 and to add the remainder of the air necessary for regeneration through a separate line 31 or additional lines discharging directly into the regenerator vessel.

Since at the low catalyst circulation rates preferred there is more heat releastd from burning carbonaceous deposits from the catalyst in the regenerator than can be carried back to the reactor with the circulating catalyst, it is necessary with most feed stocks being processed to provide cooling coils 46 through which water may be circulated to make steam or feed may be pumped to obtain preheat.

The superficial velocity of the regeneration gases through vessel 30 is so controlled as to form a dense, fluidized, turbulent bed 32 of catalyst particles and gas having a definite level L' which is superposed by a dilute or disperse phase 33 in the upper part of the regenerator comprising small amounts of catalyst entrained in the regeneration gases. The regeneration gases are taken overhead from the regenerator, preferably after passage through a cyclone separator 34 or the like which serves to remove most of the catalyst particles from the regeneration gases. The separated catalyst particles are returned to the dense bed 32 through the dip pipe attached to the bottom of the cyclone separator. The regeneration gases are discharged from cyclone separator 34 into outlet line 35 and through pressure control valve 36 to a waste gas stack or to suitable storage equipment in the event that it is desired to use the regeneration gases for stripping purposes.

The regenerator operation is controlled by allowing a small excess of oxygen in the exit gases.

The air valve is adjusted so that the desired excess of oxygen is maintained thereby assuring that essentially all deposited carbon is burned off the catalyst. This results in a carbon content of less than 0.2 wt. per cent carbon on regenerated catalyst. Complete regeneration is further evidenced by substantially complete oxidation of the catalytic metal to the hexavalent form. For example, in a fluid hydroforming operation using molybdenum oxide catalyst, analysis of equilibrium reactor catalyst indicates that the molybdenum is in essentially pentavalent form, the average valence value being generally within the range of from 4.7 to 5.0, the latter figure corresponding to the valance of molybdenum in the compound $Mo_2O_5$. In complete regeneration the molybdenum is converted essentially to the hexavalent form or to $MoO_3$, analysis of the completely regenerated catalyst indicating that the average valence value of the completely regenerated catalyst is within the range of from 5.7 to 6.0.

A wall member 37 is arranged within the regenerator and forms with the inner wall of the regenerator a stripping space or cell 38. The wall member 37 extends above the dense bed level L' and a restriction orifice or port 39 is provided to regulate the flow of regenerated catalyst into this stripper cell. The stripper could be arranged externally of the regenerator similarly to the arrangement of spent catalyst stripper 19 with respect to reactor 10 or the wall member 37 could terminate at or below the dense bed level L', in which case the catalyst would overflow from the dense bed 32 into the stripper cell. A stripping gas, such as air, nitrogen or the like, is introduced into the stripper cell through inlet line 40 in order to strip off entrained or adsorbed gaseous materials. The stripped catalyst passes from the base of the stripper cell 38 into transfer line 41 where small amounts of nitrogen may be added as a purge to free the regenerated catalyst of carbon oxides and oxygen whereupon the stripped regenerated catalyst particles are discharged through slide valve 43, the side wall of the reactor 10 directly into the dense bed 14 within the reactor. If desired, a baffle member 44 may be provided on the inner wall of the reactor 10 below the outlet end of conduit 41 in order to deflect upflowing gases and vapors and prevent their entrance into conduit 41 where they would interfere with the flow of catalyst and possibly react with the regenerated catalyst and from which they would eventually escape into the regenerator and be burned. The regenerated catalyst is discharged at essentially regenerator temperature from transfer line 41. The catalyst particles in reactor dense bed 14 are in rapid, turbulent movement and the reactor dense bed constitutes an extremely large quantity of catalyst compared to the quantity of hot, freshly regenerated catalyst added thereto. Accordingly, the stream of hot, freshly regenerated, unpretreated catalyst particles and the sensible heat carried by said particles are rapidly dispersed or dissipated in the reactor dense bed 14. Moreover, any heat generated by the reaction between the hydrogen in the reaction mixture with higher catalytic metal oxides formed in the regeneration is also dissipated rapidly throughout the bed.

The feed or charging stock to the hydroforming reactor may be a virgin naphtha, a cracked naphtha, a Fischer-Tropsch naphtha, or the like. The feed stock is preheated alone or in admixture with recycle gas to reaction temperature or to the maximum temperature possible while avoiding thermal degradation of the feed stock. Ordinarily preheating of the feed stock is carried out to temperatures of about 800°–1000° F., preferably about 950° F. The naphtha preheat should be as high as possible while avoiding thermal degradation thereof as by limiting the time of residence in the furnace and in the transfer or feed inlet lines. The preheated feed stock may be supplied to the reaction vessel in admixture with hydrogen-rich recycle gas or it may be introduced separately as shown. The recycle gas, which contains from about 50 to 80 vol. per cent hydrogen is preheated to temperatures of about 1150°–1300° F. prior to the introduction thereof into inlet line 11. The preheat of the recycle gas is dependent upon the heat requirements of the particular reactions, the upper temperature limit being set by the tendency of the hydrocarbon constituents to undergo thermal degradation. The recycle gas is introduced directly into the bottom of reactor vessel 10 and should be circulated through the reactor at a rate of from about 1000 to 10,000 cu. ft. per bbl. of naphtha feed. In view of the fact that compressors for the recycle gas constitute a substantial cost item in a plant of this type, it is desirable to keep the quantity of recycle gas to the minimum amount that will keep carbon formation within bounds and at the same time suffice to introduce the amounts of heat necessary for the reaction.

The reactor system is charged with a mass of finely divided hydroforming catalyst particles. Suitable catalyst include Group VI metal oxides, such as molybdenum oxide, chromium oxide or tungsten oxide, or mixtures thereof upon a carrier such as activated alumina, zinc aluminate spinel or the like. Preferred catalyst contain about 5 to 15 wt. percent molybdenum oxide or from about 10 to 40 wt. percent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The hydroforming reactor vessel should be operated at temperatures between about 850° and 925° F., preferably about 900° F. and at pressures between about 50 and 500 lbs. per sq. inch. Temperatures above 900° F. result in increased carbon formation and lower selectivity to gasoline fractions while at temperatures below about 900° F. operating severity is low and would, therefore, require an excessively large reaction vessel. Ordinarily lowering reactor pressure below 200 lbs. per sq. inch results in increased carbon formation which becomes excessive in most cases at pressures below about 75 lbs. per sq. inch in the case of certain catalysts, such as molybdenum oxide on alumina. In the case of molybdenum oxide or chromium oxide on zinc aluminate spinel catalysts, however, the optimum pressure appears to be about 50 lbs. per sq. inch. Above 200 lbs., however, catalyst selectivity to light products ($C_4$'s and lighter) increases rapidly. The regenerator is operated at temperatures of about 1050°–1200° F. and at substantially the same pressure as the reactor zone. The residence time of the catalyst in the reactor is of the order of from 3–4 hours and in the regenerator from 3–15 minutes.

The weight ratio of catalyst to oil introduced into the reactor should be about 0.5 to 1.5. It is preferred to operate at catalyst to oil ratios of about 1 since ratios above about 1 to 1.5 result in excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina catalyst may vary, for example, from about 1.5 wt./hr./wt. to about 0.15 wt./hr./wt.

The following examples are illustrative of the present invention.

Example 1

Experiments were made in batch fluid laboratory equipment to distinguish between the standard 900° F. pretreat with $H_2$ for 15 minutes and operation in which no reduction of the catalyst was obtained prior to the introduction of feed and recycle gas to the reactor. It is known that reduction at high temperatures (1100°–1200° F.) can result in over-pretreatment or over-reduction. Because of the heat of reduction and the heat of adsorption of the water formed in the pretreatment, it is possible to raise the catalyst bed temperature significantly during the pretreatment or during reduction which is carried out simultaneously with the hydroforming cycle, and, in effect, obtain a high temperature reduction. In these batch fluid tests, the heat formed during the reduction was quickly dissipated to a fluid sand batch surrounding the catalyst bed so that the temperature rise above the 900° F. reaction level was only 30° F. This temperature rise persisted for only 2–5 minutes and accordingly the reduction whether carried out prior to the admission of feed and recycle gas or simultaneously with the admission of feed and recycle gas, was essentially a low temperature reduction. The results of the series of tests employing no pretreat and the standard 15 minute pretreat with $H_2$ are shown below.

[No pretreat operation.]

| Run No. CFS-I-44 | 1* | | 5** | |
|---|---|---|---|---|
| Cycle | 1 | 2 | 1 | 2 |
| Reactor Temp., ° F | 900 | 900 | 900 | 900 |
| W./Hr./W | 0.29 | 0.29 | 0.30 | 0.28 |
| Recycle Gas Rate C. F./B | 3,905 | 3,891 | 4,047 | 4,194 |
| Res. O. N. Clear $C_5$—430° F | 92.6 | 91.9 | 91.3 | 90.6 |
| Vol. Percent Yield, $C_5$—430° F | 79.1 | 79.0 | 79.8 | 82.3 |
| Wt. Percent Dry Gas, $C_3$— | 11.8 | 12.5 | 11.2 | 8.9 |
| Wt. Percent Carbon | 0.5 | 0.6 | 0.3 | 0.5 |
| Vol. Percent $C_4$ | 7.1 | 6.5 | 6.9 | 7.5 |

*Feed and recycle gas started to reactor simultaneously with reactor temperature at 900° F.
**Feed and recycle gas started to reactor simultaneously with reactor temperature initially at 1,000° F. Reactor temperature was rapidly lowered to 900° F.

[15 min. pretreat with $H_2$ at 900° F. and 200 p. s. i. g.]

| Run No. CFS-I-43 | A | A | B | H | H |
|---|---|---|---|---|---|
| Cycle | 1 | 2 | 1 | 1 | 2 |
| Reactor Temp. ° F | 900 | 900 | 900 | 900 | 900 |
| W./Hr./W | 0.29 | 0.29 | 0.29 | 0.30 | 0.28 |
| Recycle Rate C. F./B | 2,900 | 3,200 | 2,800 | 3,100 | 3,400 |
| Res. O. N. Clear $C_5$—430° F | 90.6 | 91.3 | 90.4 | 89.4 | 88.9 |
| Vol. Percent Yield $C_5$—430° F | 82.0 | 82.4 | 82.4 | 82.6 | 82.2 |
| Wt. Percent Dry Gas, $C_3$— | 9.6 | 9.5 | 9.2 | 10.2 | 9.9 |
| Wt. Percent Carbon | 0.4 | 0.5 | | 0.2 | 0.3 |
| Vol. Percent $C_4$ | 5.4 | 5.1 | 5.8 | 6.0 | 5.8 |

It will be noted that the activity of the catalyst without pretreatment was possibly better than that obtained with a standard pretreatment. On a yield-octane basis, the selectivity obtained with the different catalyst treatments appears to be equivalent. The carbon yields for the tests without pretreatment may be slightly higher than those of the pretreat runs when the difference in recycle gas rate is considered. Indeed for short cycle times—equivalent to high C/O ratios it is indicated that the unpretreated catalysts might give appreciably higher carbon yields, but at long holding times in the reactor as in continuous operation where only a very small portion of the catalyst would be unreduced in the reactor at any time, the additional carbon would be negligible.

Example 2

A number of runs were conducted in a 50 barrel per day fluid hydroforming plant operating at approximately 200 lbs. per sq. inch and in contact with a catalyst containing about 9.3 wt. % molybdenum oxide upon alumina. The data obtained are summarized in the following table:

| Test No | 1 | 2 | 3 | 4 |
|---|---|---|---|---|
| Reactor Temp., ° F | 897 | 900 | 901 | 900 |
| Space Velocity (W./Hr./W.) | .25 | .25 | .24 | .24 |
| Pretreating Gas | None | None | Hydrogen | Hydrogen |
| Pretreating Temp | | | 1,004 | 996 |
| Pretreating Time | | | 10–15 secs | 10–15 secs |
| CFR Octane No | 96 | 97 | 97.8 | 96.8 |
| $C_5$+ Yield (Vol. Percent) | 75.3 | 73.6 | 73.0 | 73.3 |

These runs clearly show that the regenerated catalyst may be recycled to the reactor without pretreatment or reduction with hydrogen without loss in activity and selectivity.

The foregoing description contains a limited number of embodiments of the present invention. It will be understood, however, that numerous modifications are possible without departing from the spirit of the present invention.

What is claimed is:

1. In a process for hydroforming hydrocarbons boiling within the motor fuel range in contact with finely divided hydroforming catalyst particles consisting essentially of a Group VI metal oxide upon a carrier in accordance with the fluidized solids technique at temperatures between about 850 and 925° F., at pressures between about 50 and 500 lbs. per sq. inch and at catalyst to oil weight ratios of about 0.5 to 1.5, the improvement which comprises continuously withdrawing a stream of spent catalyst particles from a dense fluidized bed of catalyst particles in the reaction zone, regenerating the withdrawn catalyst particles by burning carbonaceous deposits therefrom with an excess of air in a regeneration zone, withdrawing a stream of regenerated catalyst from the regeneration zone, stripping the regenerated catalyst with a non-reducing stripping gas to substantially free the regenerated catalyst of carbon oxides and free oxygen and without contacting the freshly regenerated catalyst with hydrogen-containing or other reducing gases discharging the freshly regenerated catalyst directly into the dense fluidized bed of catalyst particles in the reaction zone whereby the freshly regenerated catalyst particles are treated with hydrogen-containing reactant gases while in intimate mixture with the main body of reactor catalyst in the reaction zone at substantially reaction zone temperature.

2. The process as defined in claim 1 in which the catalytic metal in the regenerated catalyst is oxidized to an average valence value of from 5.7 to 6.

3. The process as defined in claim 1 in which the regeneration zone is operated at temperatures of about 1050°–1200° F. and at essentially the same pressure as the reaction zone and the catalytic metal in the regenerated catalyst is oxidized to an average valence value of from 5.7 to 6.

4. The process as defined in claim 1 in which the regeneration zone is operated at temperatures of about 1050°–1200° F. and at essentially the same pressure as the reaction zone, and the regenerated catalyst is discharged in this highly oxidized state and substantially at regenerator temperature directly into the dense catalyst bed in the reaction zone.

References Cited in the file of this patent

UNITED STATES PATENTS

| Number | Name | Date |
|---|---|---|
| 2,410,891 | Meinert et al. | Nov. 12, 1946 |
| 2,518,693 | Jahnig | Aug. 15, 1950 |
| 2,656,304 | Mac Pherson, Jr., et al. | Oct. 20, 1943 |